United States Patent
Claudio-Alvarado

(10) Patent No.: US 7,303,665 B1
(45) Date of Patent: Dec. 4, 2007

(54) AQUARIUM DRAINAGE AND WASTE DETECTION SYSTEM

(76) Inventor: Pedro A. Claudio-Alvarado, P.O. Box 560-900, Guavanilla, PR (US) 00656

( * ) Notice: Subject to any disclaimer, the term of this patent is extended or adjusted under 35 U.S.C. 154(b) by 55 days.

(21) Appl. No.: 11/148,855

(22) Filed: Jun. 8, 2005

Related U.S. Application Data

(60) Provisional application No. 60/577,806, filed on Jun. 8, 2004.

(51) Int. Cl.
*A01K 63/04* (2006.01)
*B01D 24/22* (2006.01)
*B01D 35/027* (2006.01)

(52) U.S. Cl. .................. 210/97; 210/109; 210/167.23; 210/167.25; 210/293; 119/259

(58) Field of Classification Search ........... 210/167.01, 210/167.21, 167.23, 167.24, 263, 293, 85, 210/94, 97, 109, 147, 167.25; 119/259
See application file for complete search history.

(56) References Cited

U.S. PATENT DOCUMENTS

| | | | | |
|---|---|---|---|---|
| 3,418,973 A | * | 12/1968 | Shinichi | 119/226 |
| 3,433,359 A | * | 3/1969 | Lundin et al. | 210/199 |
| 4,151,810 A | * | 5/1979 | Wiggins | 119/262 |
| 4,182,273 A | * | 1/1980 | Peterson | 119/51.5 |
| 4,687,121 A | * | 8/1987 | Copeland, James L. | 222/64 |
| 5,057,211 A | * | 10/1991 | Baummer | 209/448 |
| 5,269,914 A | * | 12/1993 | Englert | 210/151 |
| 5,681,482 A | * | 10/1997 | Reber | 210/739 |
| 5,785,732 A | * | 7/1998 | Tsuchimoto et al. | 75/375 |
| 5,944,196 A | * | 8/1999 | Oram et al. | 209/158 |
| 6,896,799 B2 | * | 5/2005 | Ohanian | 210/167.23 |
| 2006/0006114 A1 | * | 1/2006 | Deskins | 210/724 |

* cited by examiner

Primary Examiner—Fred G. Prince
(74) Attorney, Agent, or Firm—Hector M. Reyes-Rivera

(57) ABSTRACT

An aquarium drainage system having a filter, funnel, clear tube, sensor housing, light sensor, light beam generator, waste indicator light, primary valve, secondary/safety valve, safety cap and safety switch, as well as the other components shown in the drawings, wherein the filter comprises a vented plate that is placed under the gravel at the bottom of the tank to allow the waste to travel downward under the force of gravity to the funnel where waste is directed to the clear tube connected to the bottom of the funnel. The sensor sends a signal to the waste indicator light when blocked causing the special primary valve to open allowing the waste to drop and be collected in a bucket.

10 Claims, 8 Drawing Sheets

AQUARIUM DRAINAGE AND WASTE DETECTION SYSTEM

CROSS REFERENCE TO RELATED APPLICATIONS

This application claims the benefit of provisional patent application Ser. No. 60/577,806 filed Jun. 8, 2004.

BACKGROUND OF THE INVENTION

1. Field of the Invention

This invention relates generally to an aquarium, and more particularly, to a drainage system and detector for monitoring the buildup of waste and contamination of an aquarium.

2. Description of the Background Art

The build-up of fish waste, ammonia and fish food is a well known problem with aquariums. Aquariums must be periodically cleaned to eliminate the waste and prevent contamination. Aquariums are conventionally cleaned from the top of the tank and must be emptied before cleaning. This can be time consuming and tedious. In addition, oftentimes owners forget to clean the tank resulting in excessive waste build-up and contamination. If a device or system existed for detecting the build-up of waste and cleaning aquariums without necessitating the removal of its contents, it would be well received. The instant invention addresses this unfulfilled need in the prior art by providing an aquarium drainage and detection system as contemplated by the instant invention.

BRIEF SUMMARY OF THE INVENTION

In light of the foregoing, it is an object of the present invention to provide an aquarium drainage and waste detection system to clean aquariums without having to remove, siphon or scoop water therefrom.

It is also an object of the instant invention to provide an aquarium drainage and waste detection system that utilizes the force of gravity to remove ammonia and fish waste.

It is an additional object of the instant invention to provide an aquarium drainage and waste detection system that monitors the amount of suspended food and waste in the aquarium water without repeated sampling.

It is another object of the instant invention to provide an aquarium drainage and waste detection system that eliminates waste from the bottom of the tank without complex and expensive filters or having to remove any fish or plants.

It is a further object of the instant invention to provide an aquarium drainage and waste detection system that is cost effective and conducive to mass production.

In light of these and other objects, the instant invention is an aquarium drainage system comprising a filter, funnel, clear tube, sensor housing, light sensor, light beam generator, waste indicator light, primary valve, secondary/safety valve, safety cap and safety switch, as well as the other components shown in the drawings. The filter comprises a vented plate that is placed under the gravel at the bottom of the tank to allow the waste to travel downward under the force of gravity to the funnel. Waste collected in the funnel is directed to the clear tube, which is connected to the bottom of the funnel. The sensor comprises a photocell located in the sensor housing at an end opposite the light beam generator and opposite sides of the clear tubing and that sends a signal to the waste indicator light when blocked. When the waste indicator light is energized a red light shines and the special primary valve opens causing the waste to exit the funnel allowing the waste to drop and be collected in a bucket. A safety switch may be included to turn the sensor on and off.

In accordance with these and other objects, which will become apparent hereinafter, the instant invention will now be described with particular reference to the accompanying drawings.

DETAILED DESCRIPTION OF THE INVENTION

With reference to the drawings, FIGS. 1 to 16 depict the preferred embodiment of the instant invention which is generally referenced as an aquarium drainage system and, or by numeric character 10. The instant invention 10 provides an aquarium drainage system that employs a funnel-based design to eliminate ammonia and fish waste, generally referenced herein as waste. The aquarium drainage system 10 eliminates waste from the bottom of the tank without complex and expensive filters or having to remove any fish or plants.

Figure 1:
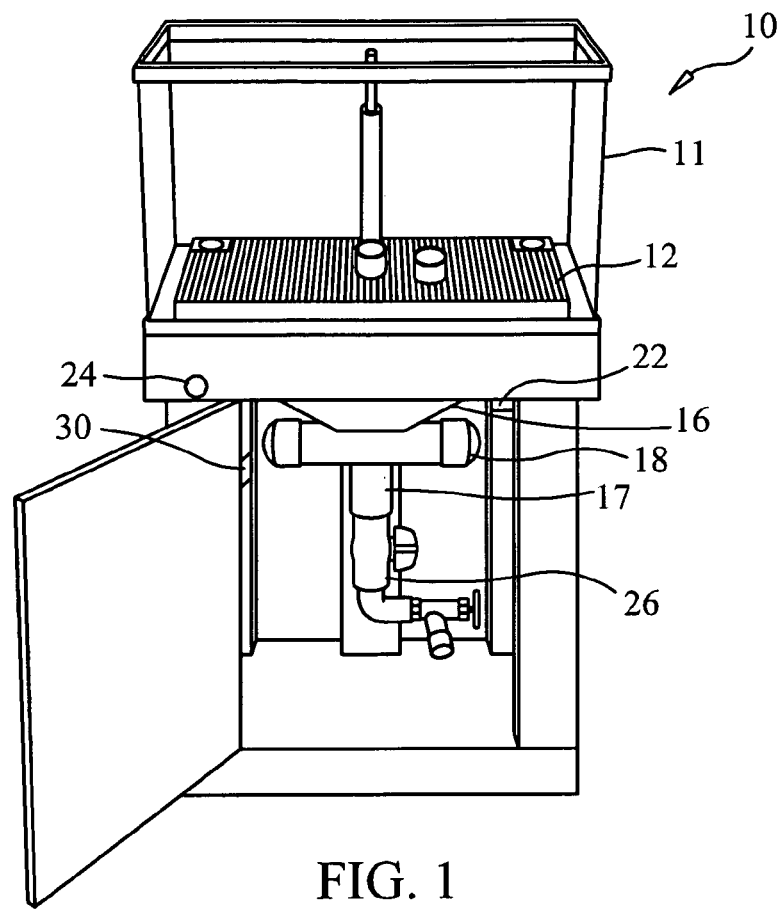
FIGS. 1-16 provide various views of the preferred embodiment of the aquarium drainage system and its components in accordance with the instant invention.
Figure 2:
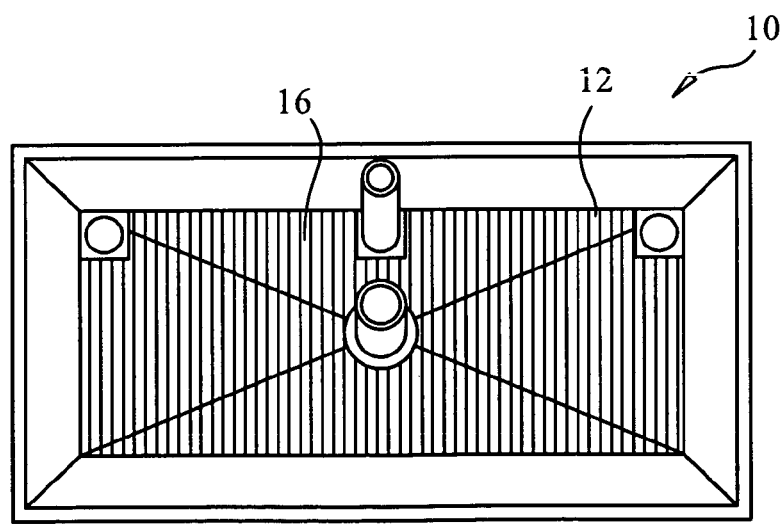
Figure 3:
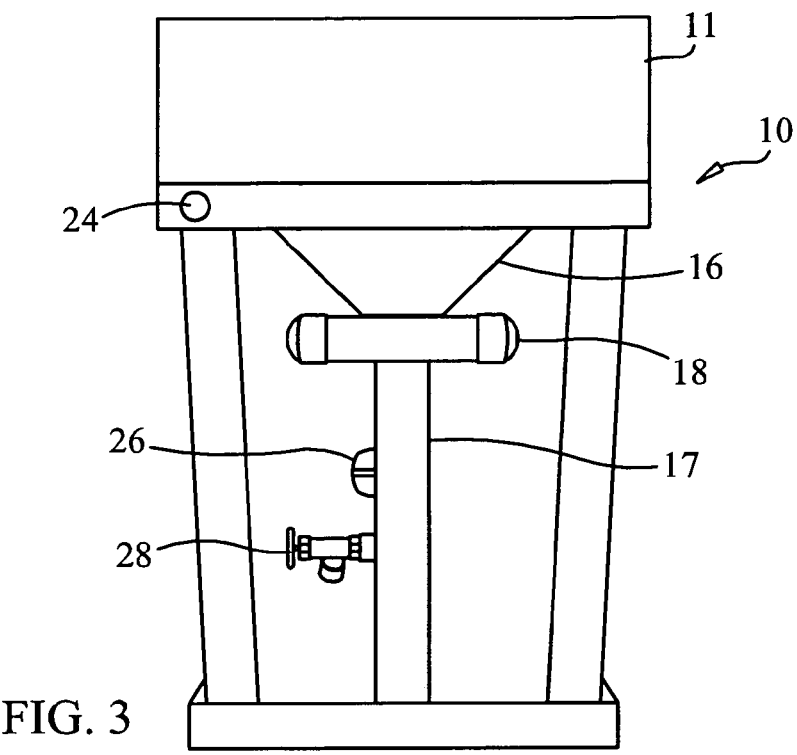
Figure 4:
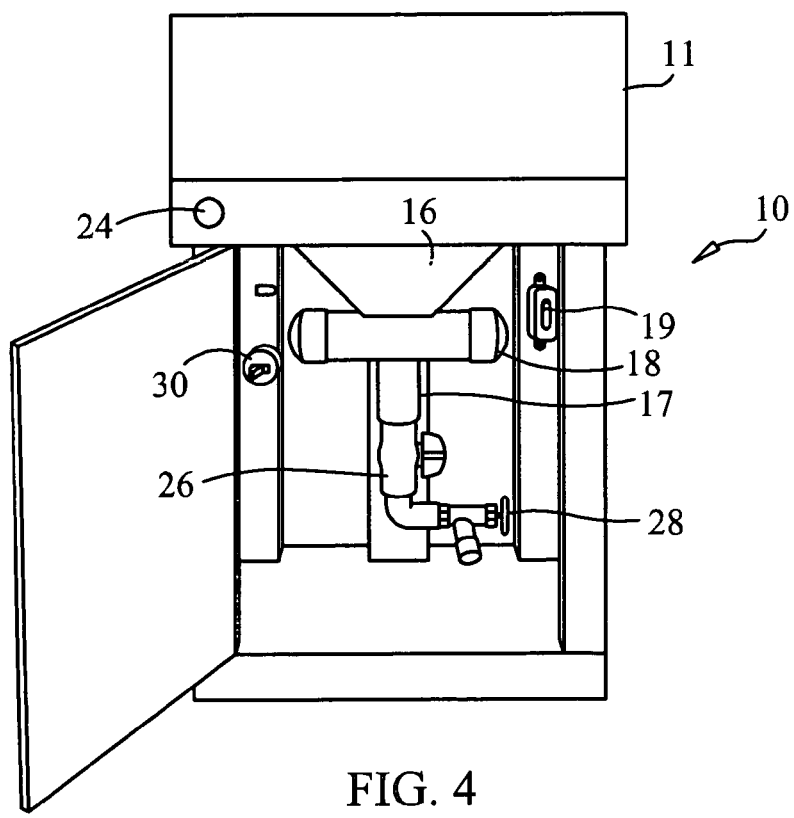
Figure 5:
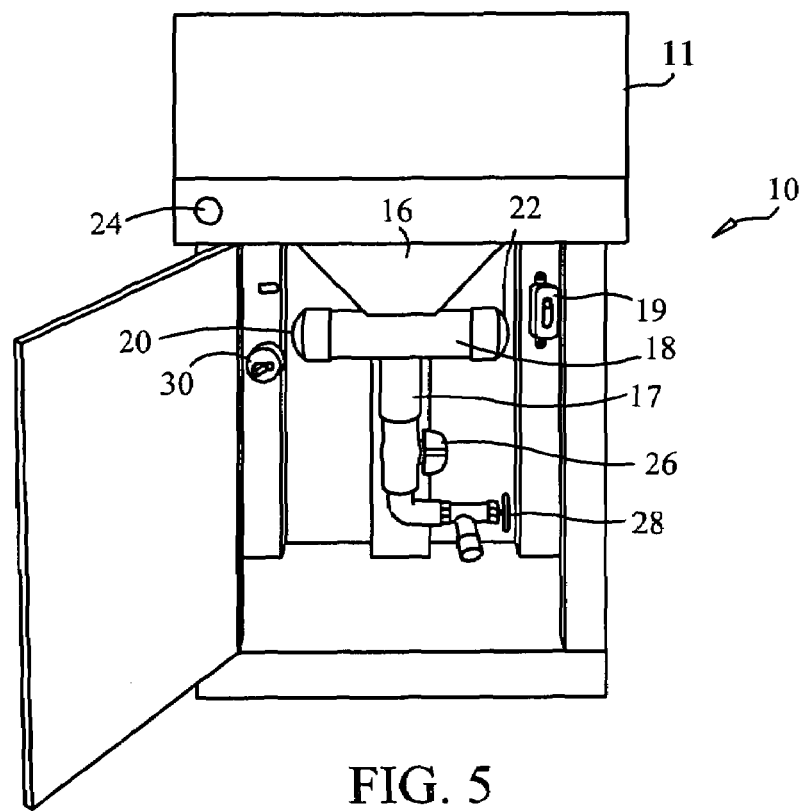
Figure 6:
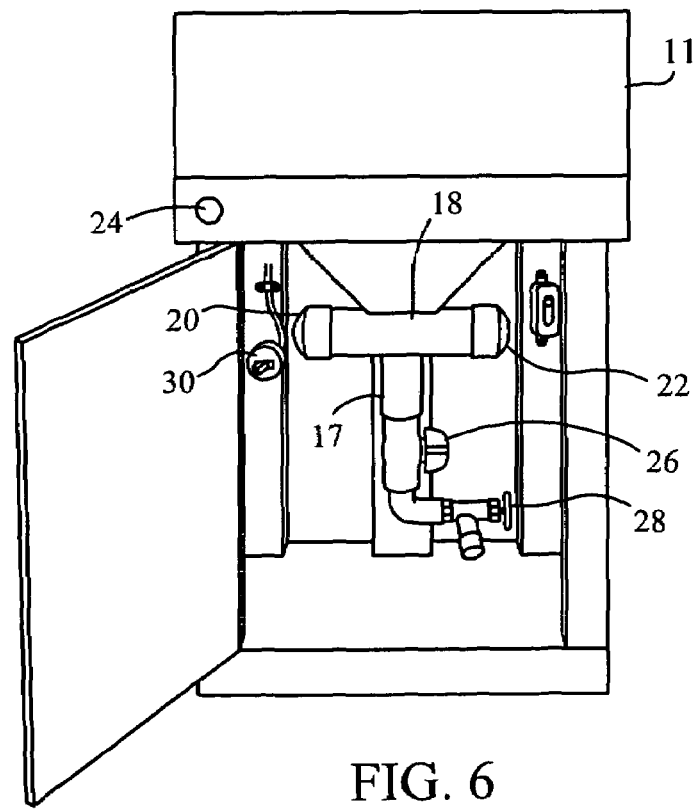
Figure 7:
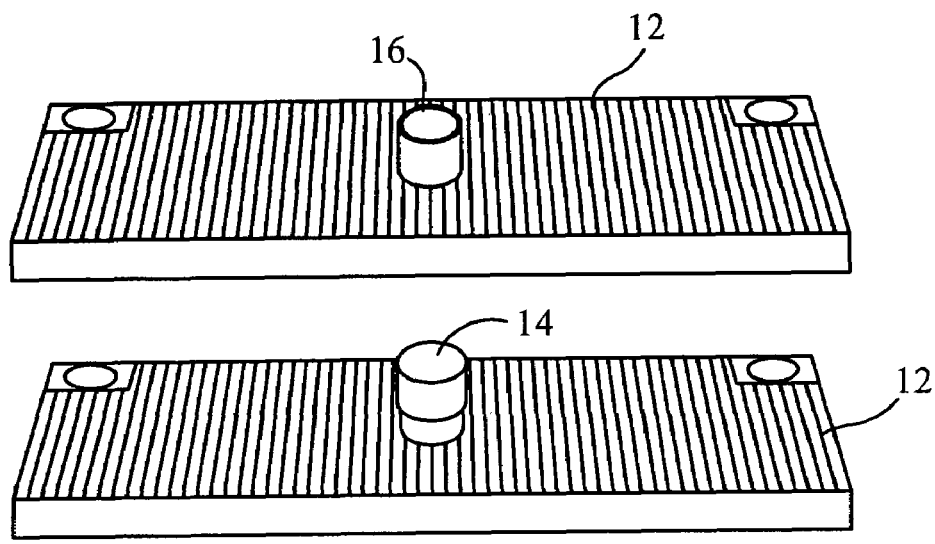
Figure 8:
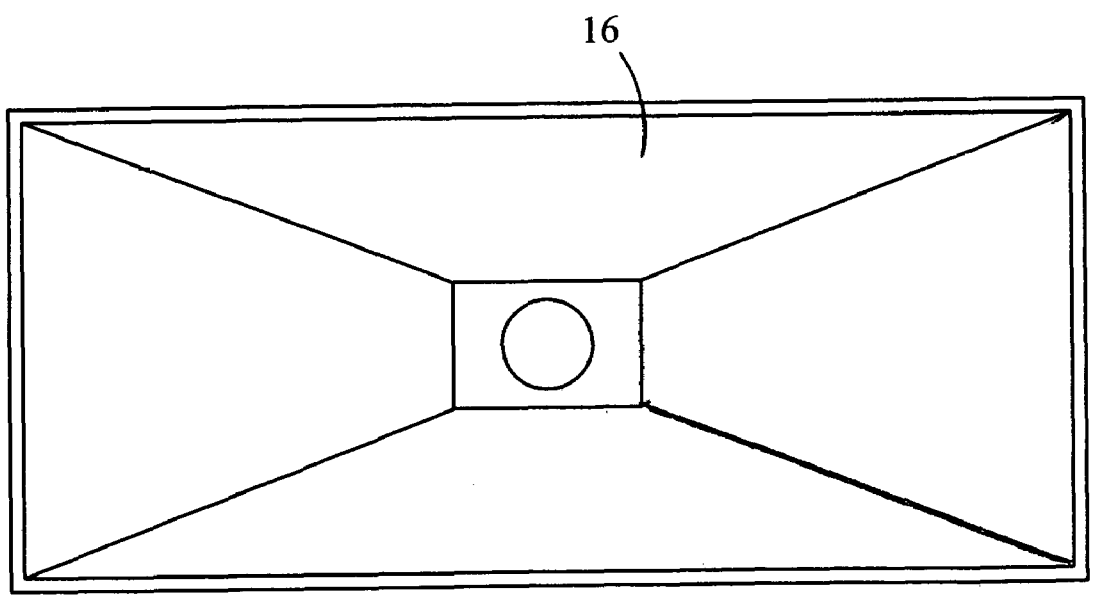
Figure 9:
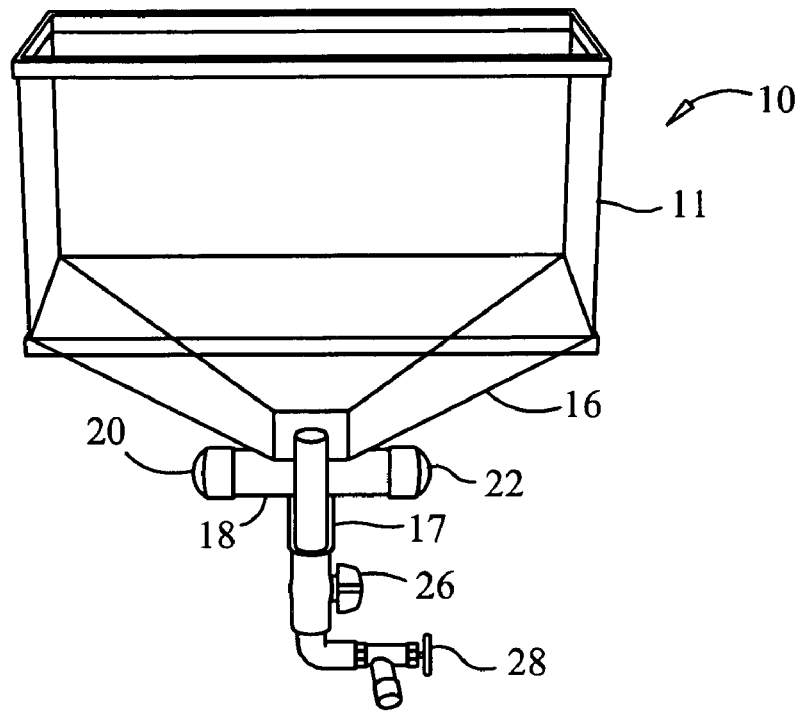
Figure 10:
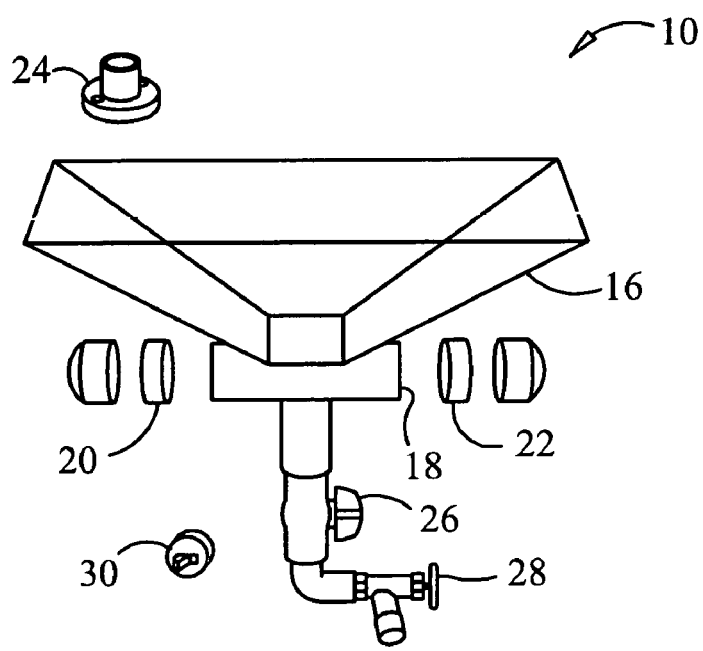
Figure 11:
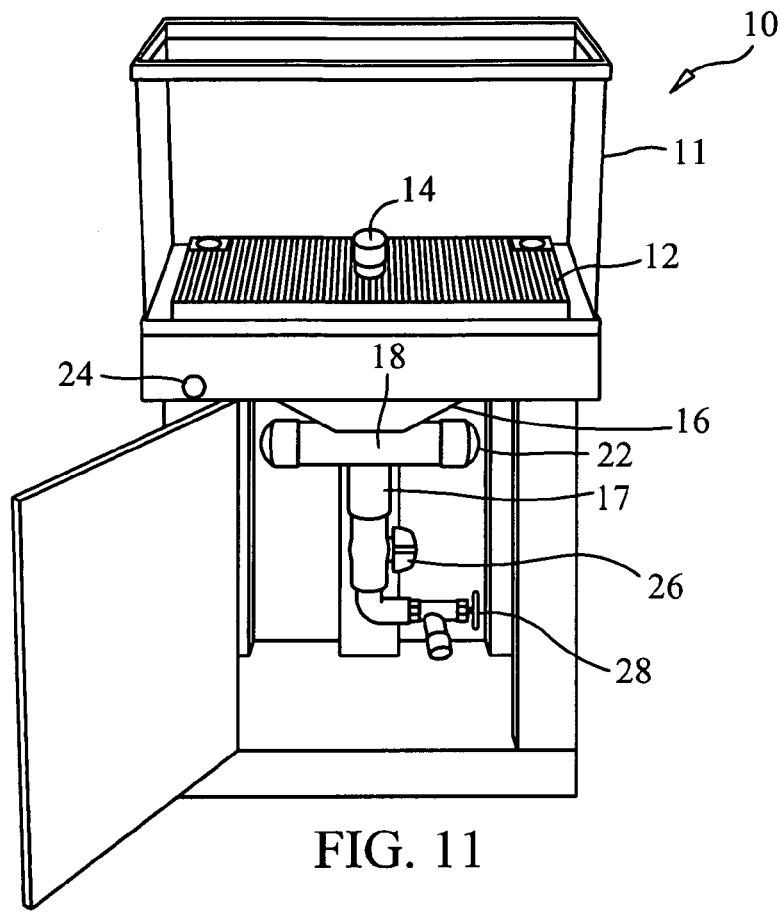
Figure 12:
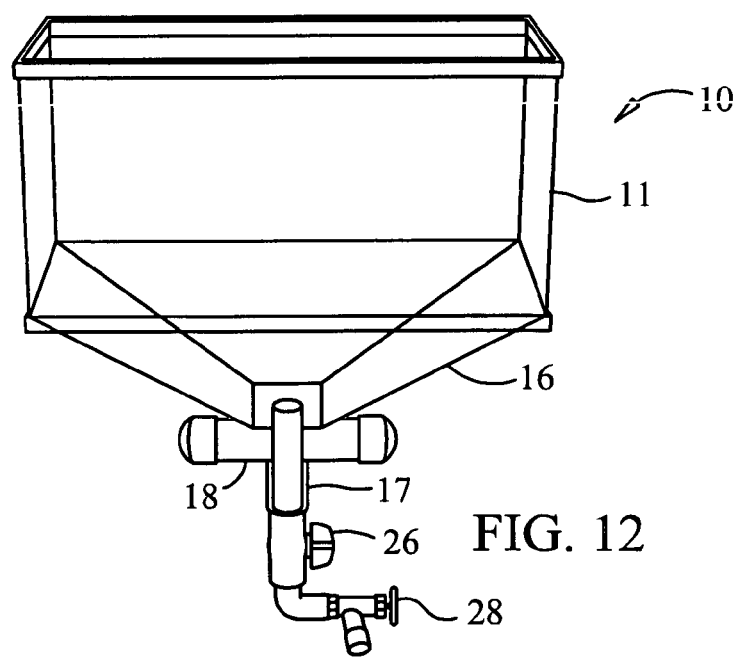
Figure 13:
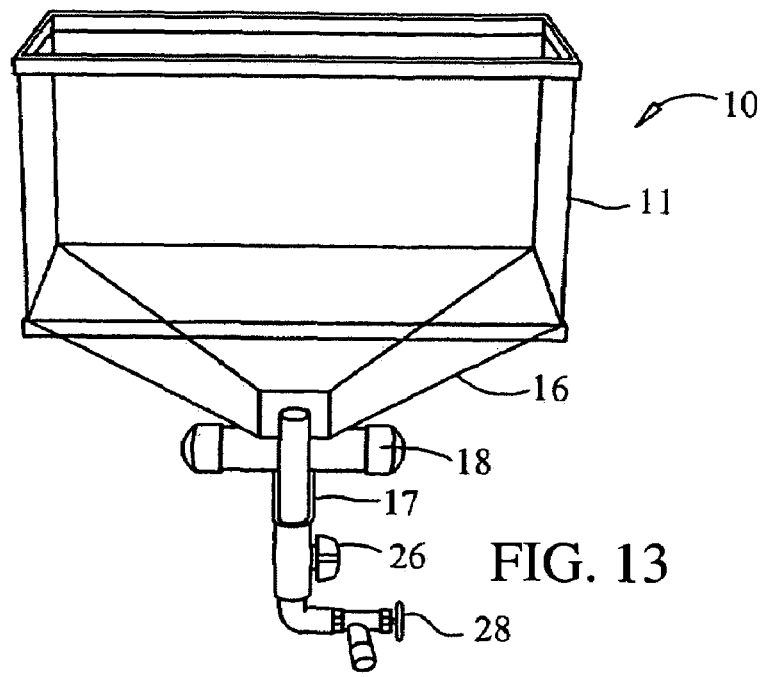
Figure 14:
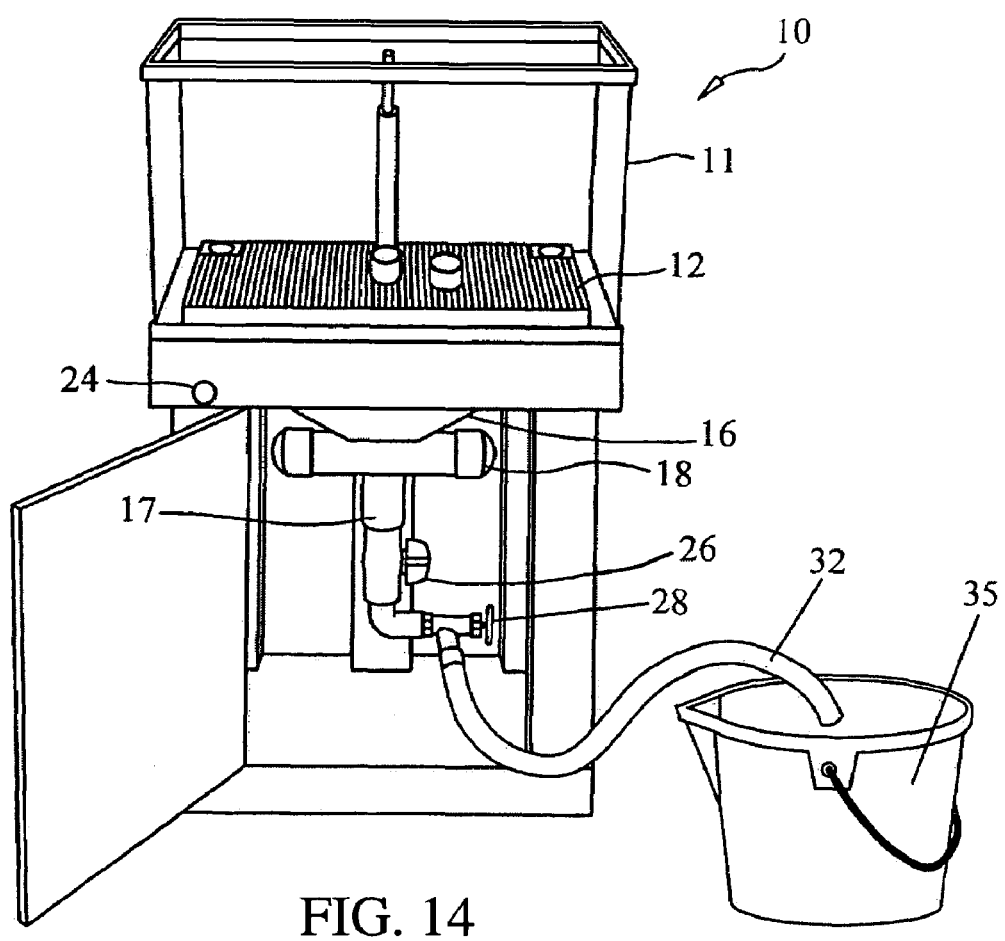
Figure 15:
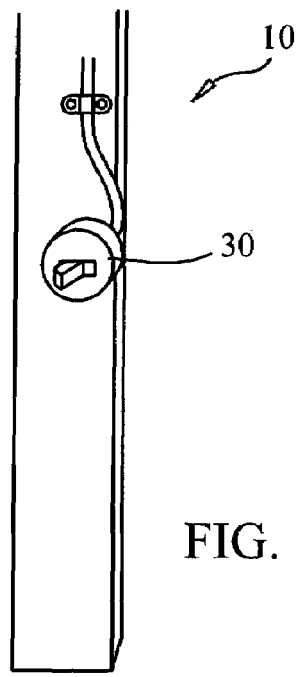
Figure 16:
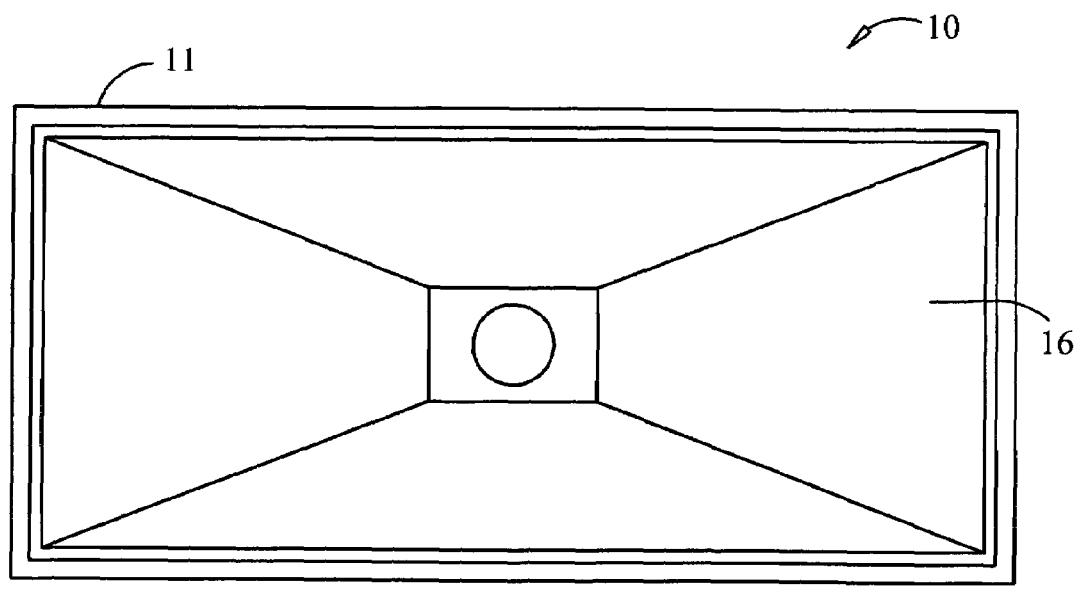

With reference to FIGS. 1-16, the aquarium drainage system 10 generally comprises a filter 12, funnel 16, clear tube 17, sensor housing 18, light sensor 20, light beam generator 22, waste indicator light 24, primary valve 26, secondary/safety valve 28, safety cap 14, and safety switch 30, as well as the other components shown in the drawings. The filter 12 comprises a vented plate, shown in FIG. 7 that is placed under the gravel at the bottom of the tank, as shown in FIG. 1 and allows the waste to travel downward under the force of gravity to the funnel 16. With reference to FIGS. 8 and 9, waste is collected in the funnel 16 and directed to the clear tube 17, which is connected to the bottom of the funnel 16. With reference to FIGS. 10 and 11, the sensor 20 comprises a photocell located in the sensor housing 18 at an end opposite the light beam generator 22 and opposite sides of the clear tubing 17. When the level of waste reaches a certain level, the light beam is blocked from the photocell sensor 20 causing the sensor 20 to send a signal to the waste indicator light 24. When the waste indicator light 24 is energized a red light shines and the special primary valve 26 opens causing the waste to exit the funnel 16, as shown in FIG. 12. Referring to FIG. 14, the secondary/safety valve 28 then opens to allow the waste to drop and be collected in a bucket 35. With reference to FIG. 14, the safety cap 14 must be removed for the second valve 28 to allow the collection of waste in the bucket 35. A 3-inch by ¾ inch hose 32 is preferably connected to the second valve 28 at one end in placed or connected to the bucket 35 at the opposite end. Referring to FIG. 15, a safety switch 30 may be included to turn the sensor 20 on and off. Turning off the sensor 20 will extend the life of the sensor 20.

With reference to FIGS. 1-16 and the foregoing description, the aquarium drainage system 10 comprises a detection device for the buildup of waste and drainage system for aquariums.

The invention 10 features a funnel-shaped scaled plenum chamber 16 located beneath an aquarium tank. The funnel chamber 16 is located beneath the sand-filled filter 12 in the bottom of the aquarium. The funnel-shaped chamber 16 is connected to the clear tube above the two drain valves 26, 28. The sensor housing 18 contains the photocell sensor 20 and light source 22 and is located between the funnel-shaped chamber 16 and the first drain valve 26. The output from the photocell 20 is used to signal an increase in turbidity above a predetermined level.

The aquarium drainage system 10 allows aquarium users to drain water and suspended contents from a aquarium using gravity instead of having to siphon or scoop water from the aquarium. The system 10 also allows the user to monitor the amount of suspended food and wastes in the water without the necessity of repeated sampling.

The system 10 may be manufactured as an attachment to the open bottom of a conventional aquarium or it may be part of a complete aquarium. The system 10 may have other types of sensor or detector 20 for sensing waste level, such as limit switches or sound switches and may include a digital or analog readout of the percent turbidity. The drain valves 26, 28 may be mechanical or electrical solenoids. Ion selective electrodes with appropriate signal processing electronics may be incorporated into the turbidity-monitoring chamber 16. The turbidity detecting and determining portion of this invention may consist of an internal incandescent light source and a photodetector connected to an appropriate amplifier and readout device. The turbidity detecting and determining portion of this invention may also consist of a light emitting diode (LED) and an electronic detector that measures the change in light intensity from a predetermined value. The invention's turbidity readout device may be a light, sound or analog or digital meter.

The invention 10 may have one or more drain valves 26, 28 located beneath the turbidity determination chamber 16. These valves may be connected in a series configuration with one or more ballast chambers between valves. The purpose of these ballast chambers is to hold a portion of the aquarium's contents, preventing the accidental draining of all of the water from an aquarium. The valves 26, 28 may be manual ball or gate valves or they may be electrically operated solenoid valves. The funnel-shaped chamber 16 may be manufactured from polyvinyl chloride (PVC) plastic, fiber reinforced epoxy (fiberglass), metal or glass. The sand-filled filter 12 may be manufactured from porous polyvinyl chloride (PVC) plastic, porous fiber reinforced epoxy (fiberglass) or metal mesh. Spun fibers, porous membranes or other types of filtering media may be used to line the bottom of the aquarium.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. An aquarium waste drainage and detection system for a tank, said system comprising:
    a) filter means for filtering, said filtering means being positionable at the bottom of the tank;
    b) funnel means for funneling, said funneling means being located beneath said filter means to receive waste from said filter means;
    c) sensor means, in communication with said funnel means, for determining when waste reaches a predetermined level in said funnel and generating a signal when waste reaches a predetermined level;
    d) valve means, in communication with said funnel means and said sensor means, for selectively opening to allow waste to exit said funnel means when waste said sensor means generates said signal;
    e) collection means, in fluid communication with said valve means and said funnel means, for receiving waste from said funnel means when said valve means opens and;

wherein the waste travel downward from the top of the tank to the said collection means under the force of gravity.

2. The system as recited in claim 1, further comprising drain means, which are in fluid communication with said funnel means, for receiving waste received from said funnel means and directing it to said collection means.

3. The system as recited in claim 1, further comprising a housing in communication with said funnel means for storing said sensor means.

4. The system as recited in claim 1, further comprising means for selectively energizing said valve means.

5. The system as recited in claim 1, wherein said filter means comprises a sand filter.

6. The system as recited in claim 1, wherein said sensor means comprises a photocell sensor.

7. The system as recited in claim 1, further comprising means for selectively energizing said sensor means.

8. The system as recited in claim 1, wherein the collection means comprises a hose and a bucket.

9. An aquarium or fish tank comprising the drainage waste and detection system as recited in claim 1.

10. The aquarium recited in claim 9, further comprising a cabinet surrounding the said drainage waste and detection system in order to hide the said drainage waste and detection system from the public view.

* * * * *